US008893137B2

(12) United States Patent
Therrien

(10) Patent No.: US 8,893,137 B2
(45) Date of Patent: Nov. 18, 2014

(54) TRANSACTION-BASED SHARED MEMORY PROTECTION FOR HIGH AVAILABILITY ENVIRONMENTS

(75) Inventor: Paul Jacques Therrien, Kanata (CA)

(73) Assignee: Cisco Technology, Inc., San Jose, CA (US)

(*) Notice: Subject to any disclaimer, the term of this patent is extended or adjusted under 35 U.S.C. 154(b) by 232 days.

(21) Appl. No.: 13/419,232

(22) Filed: Mar. 13, 2012

(65) Prior Publication Data

US 2013/0247053 A1    Sep. 19, 2013

(51) Int. Cl.
*G06F 9/46* (2006.01)
*G06F 9/52* (2006.01)

(52) U.S. Cl.
CPC . *G06F 9/52* (2013.01); *G06F 9/526* (2013.01)
USPC .............................. 718/102; 718/100; 718/101

(58) Field of Classification Search
CPC .................................. G06F 9/52; G06F 9/526
USPC ............................ 718/103, 107, 100, 101, 102
See application file for complete search history.

(56) References Cited

U.S. PATENT DOCUMENTS

| 5,095,421 | A | * | 3/1992 | Freund | 718/101 |
| 5,822,788 | A | * | 10/1998 | Kahn et al. | 711/213 |
| 6,697,834 | B1 | * | 2/2004 | Dice | 718/102 |
| 7,178,062 | B1 | * | 2/2007 | Dice | 714/38.13 |
| 7,398,355 | B1 | * | 7/2008 | Moir et al. | 711/118 |
| 8,230,421 | B2 | | 7/2012 | Shavit et al. | |
| 2004/0162948 | A1 | * | 8/2004 | Tremblay et al. | 711/137 |
| 2006/0225078 | A1 | * | 10/2006 | Anderson | 718/104 |
| 2007/0233970 | A1 | | 10/2007 | Saha et al. | |
| 2009/0193416 | A1 | * | 7/2009 | Kahlon | 718/100 |
| 2011/0154343 | A1 | * | 6/2011 | Michael et al. | 718/102 |
| 2011/0307894 | A1 | * | 12/2011 | Hinton et al. | 718/102 |
| 2012/0005684 | A1 | * | 1/2012 | Ziarek | 718/103 |
| 2013/0061230 | A1 | * | 3/2013 | Papakipos et al. | 718/102 |

OTHER PUBLICATIONS

Harris, Timothy L, et al., "A practical multi-word compare-and-swap operation", In Proceedings of the 16th International Symposium on Distributed Computing, (2002), 265-279.

* cited by examiner

*Primary Examiner* — Emerson Puente
*Assistant Examiner* — Willy W Huaracha

(57) ABSTRACT

Various systems and methods for implementing a transaction-based shared memory protection for high availability environments are described herein. A processing thread is executed, with the processing thread configured to access a multi-stage critical section, the multi-stage critical section having a first and second stage, the first stage to store a staging area of a plurality of operations to be executed in the memory shared with at least one other processing thread, and the second stage to execute the operations from the staging area. The thread further configured to determine whether the staging area includes an indication of successfully completing the first stage and execute the operations when there is an indication of successfully completing the first stage.

18 Claims, 7 Drawing Sheets

TRANSACTION-BASED SHARED MEMORY PROTECTION FOR HIGH AVAILABILITY ENVIRONMENTS

TECHNICAL FIELD

The present disclosure relates generally to memory protection and in particular transaction-based shared memory protection for high availability environments.

BACKGROUND

Consider a high availability environment where processes can be killed and restarted for various reasons, such as part of recovery of an abnormal termination. In such an environment, shared memory can be used to preserve state across restart events and share or exchange data between processes or threads. Shared memory can be mapped into each participating process' memory space. This allows arbitrary structures to be overlaid to this memory. When multiple threads access shared memory, concurrency issues may be encountered. One mechanism to handle such concurrency issues includes mutual exclusion mechanisms (e.g., semaphores and mutexes). Such mechanisms implement a critical or protected section of code where memory manipulation can occur while other processes or threads are blocked from accessing the memory being manipulated. If a process or thread restarts while executing a critical section, concurrency issues may arise.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
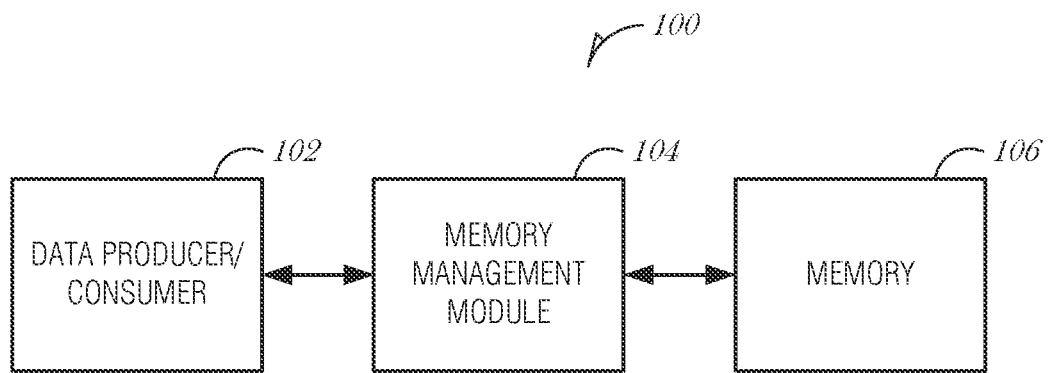
FIG. 1 is a block diagram illustrating a system according to an embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

The present disclosure provides techniques and configurations used for providing transaction-based shared memory protection for high availability environments.

As used herein, the term "process" refers to an instance of a computer program being executed. Where a computer program is a passive collection of instructions, a process is an instance of the actual execution of those instructions. Some computing platforms provide for multiple processes, or instances, of the same executable instructions.

As used herein, the term "thread" refers to the smallest unit of processing that can be scheduled by an operating system. In some cases, a process is the smallest unit, and in such cases, a process is synonymous with a thread. In other cases, a process may include multiple threads of execution. Each thread may be executed on the same process, such as in a time-division multiplexing (e.g., multitasking) or on several processors, such as in a multi-core processor machine. Some operating systems and hardware platforms provide a combination of multitasking and multiprocessing.

As used herein, the term "critical section" refers to a piece of code that accesses a shared resource that must not be concurrently accessed by more than one thread. Some synchronization mechanism is required at the entry and exit of the critical section to ensure exclusive use, for example a semaphore or a mutex. A critical section may also be referred to as a protected section.

In the following description, the concepts are discussed in the context of threads. It is understood that these concepts may also be implemented at a process level and that the concept of processes may be substituted when referring to threads in the example provided.

In a conventional implementation of critical sections, a lock may be used to provide exclusive access to shared memory. For example, a thread that seeks to update shared memory may first take a lock (e.g., obtain a lock from the operating system indicating that the thread has exclusive access to at least a portion of shared memory), then perform updates to memory locations within the locked shared memory, and after the updates are completed, release the lock. Other threads that wish to access the shared memory first request a lock, but when the lock is unavailable, then the requesting thread goes into a wait state (e.g., blocks on the lock). One or more requesting threads may be placed in a queue or list to be processed in an ordered manner, or may reattempt to access the shared memory independently.

When a thread's processing is interrupted after taking a lock but before releasing it, e.g., in the critical section, the memory is left in an incoherent state. Many modern operating systems provide the ability to detect when a current holder of a lock no longer has access to the memory. In this case, the operating system may allow for a revival of the lock, in which case the thread that previously held the lock is granted the lock again and informed that the lock was revived. Recovery is not necessarily performed by the thread that crashed or was killed; it is possible to have another thread "listen" for such events, and take recovery action accordingly. This is useful for a non-collaborative lock-free/wait-free variant, where such "listening" is used to trigger the recovery (the restarting thread may "discover" and recover on its own as well). It is then left to the recovery thread to perform the appropriate recovery actions before releasing the lock for other threads to use.

For a thread, recovery from a restart is challenging and even more so when the thread was interrupted while executing a critical section of code. The restarted thread cannot deduce the full intent behind the shared memory update that was in progress. Further, the restarted thread cannot determine how much, if any, of the critical section was executed before the restart. Further, it is unclear whether the update should continue to completion or be aborted and any changes backed out. Thus, it is desirable to find a means of recovering from restart events irrespective of the nature or complexity of the operation, while maintaining memory coherency.

In some implementations, shared memory recovery involves using a program or code that, upon detection of a restart condition, traverses the shared memory and attempts to establish a valid state. However, such program or code may not always determine the nature of the operation that was in progress when the restart occurred, and so cannot guarantee that the reestablished state represent a recovery of the actual state prior to the restart, even though the recovered state may be considered self-coherent.

What is needed then is a mechanism to provide recovery from a restart involving a multi-word update. Examples of such mechanisms are illustrated and discussed in general in FIGS. 1-4, and with specific instances in FIGS. 5-9.

FIG. 1 is a block diagram illustrating a system 100 according to an embodiment. The system 100 includes data producers and consumers 102, a memory management module 104, and memory 106. The data producers and consumers 102 may be user applications, operating system processes, or other processing objects that produce data write data) to memory 106 or consume data (e.g., read data) from the memory 106.

The memory management module 104 includes hardware and/or software capable of reading and writing to the memory 106. The memory management module 104 may include user level libraries, operating system routines, such as those that may exist in hardware abstraction layers, or other software constructs that access memory. The memory managegement module 104 may also optionally refer to hardware devices that access, manage, or control memory.

Figure 2:
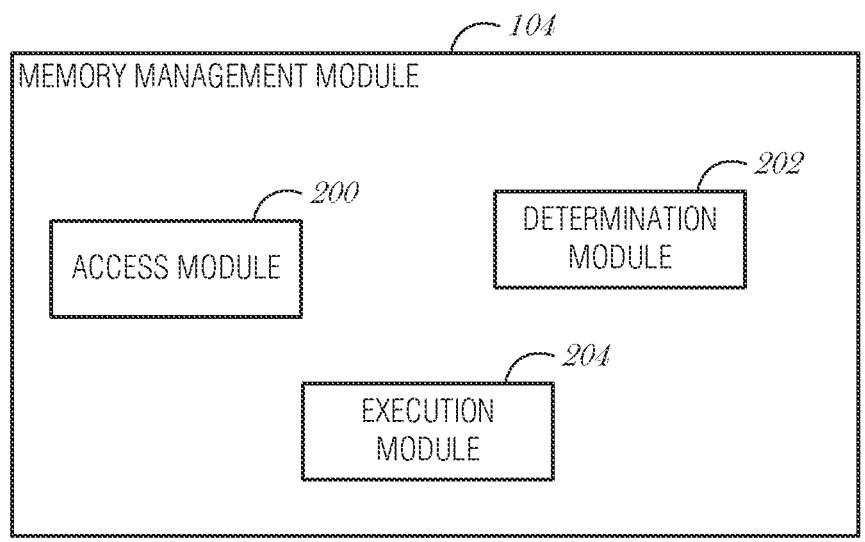
FIG. 2 is a block diagram illustrating modules of a memory management module, according to an embodiment.

FIG. 2 is a block diagram illustrating modules of a memory management module 104, according to an embodiment. As shown in FIG. 2, there is an access module 200, a determination module 202, and an execution module 204. The access module 200 may be configured to access a multi-stage critical section, the multi-stage critical section having a first and second stage, the first stage to store a staging area of a plurality of operations to be executed in memory shared with at least one other processing thread, and the second stage to execute the operations from the staging area. The determination module 202 may be configured to determine whether the staging area includes an indication of successfully completing the first stage. Then, the execution module 204 may be configured to execute the operations when there is an indication of successfully completing the first stage. In addition, the modules 200, 202, and 204 may be configured to perform the operations discussed in the flowcharts below.

Figure 3:
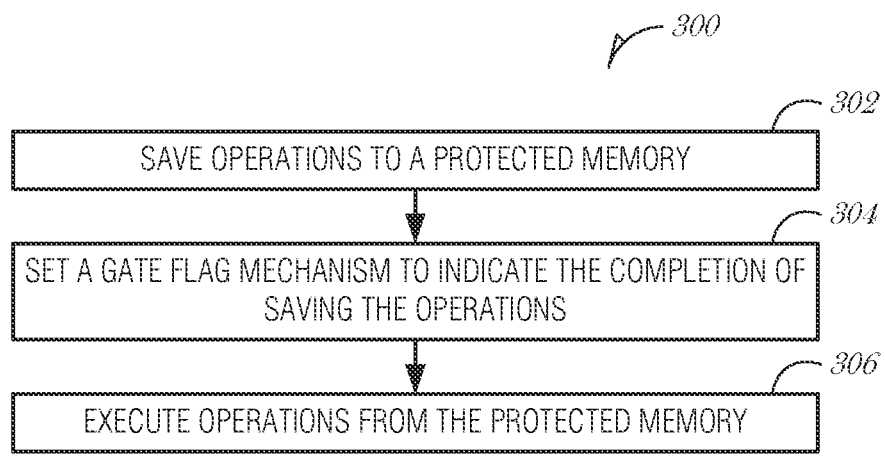
FIG. 3 is a flowchart illustrating a general form of a mechanism for transaction-based shared memory protection, according to an embodiment.

FIG. 3 is a flowchart illustrating a general form of a mechanism 300 for transaction-based shared memory protection, according to an embodiment. A thread designed to execute one or more operations on shared memory may use the mechanism 300 to store and perform the operations. At block 302, one or more operations are saved to a protected memory. The protected memory may exist in memory shared by a plurality of threads. The protected memory may be assigned or mapped to one of the plurality of threads, such that others of the plurality of threads are not allowed to access the protected memory.

At block 304, once all of the operations that the thread intends to perform on the shared memory are saved to protected memory, a gate flag mechanism is set to indicate the completion of saving the operations. Once the gate flag mechanism is set, the operations, which may be considered a transaction, is deemed successful. As will be illustrated in specific examples, the saved operations in combination with the flag mechanism provides for an "all or nothing" transactional model, such that the operations are guaranteed to be committed once the flag mechanism is set to indicate success.

At block 306, the operations are executed. The operations may be executed in an ordered manner. The order may be determined or designed such that if the thread is interrupted or killed, recovery of the operations is performed in a manner that maintains memory coherency.

Figure 4:
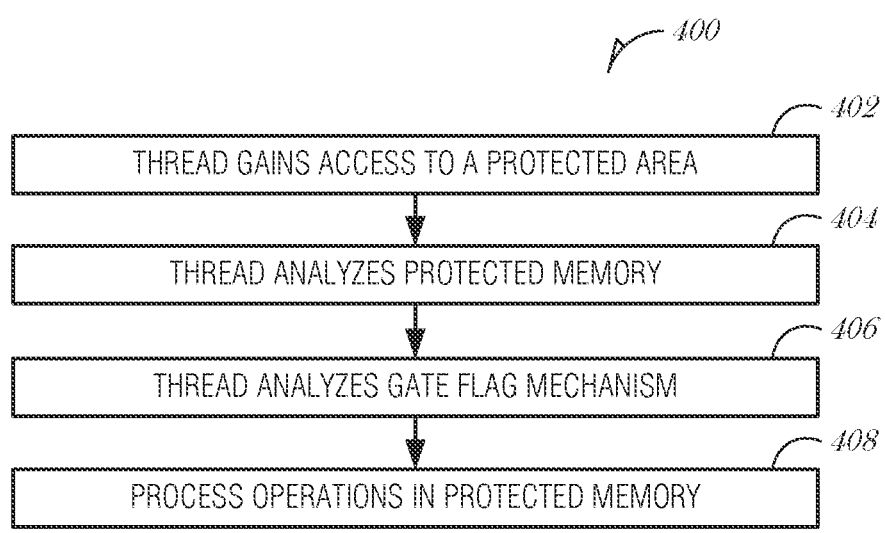
FIG. 4 is a flowchart illustrating a general form of a mechanism for recovery after a thread has been killed or restarted, according to an embodiment.

FIG. 4 is a flowchart illustrating a general form of a mechanism 400 for recovery after a thread has been killed or restarted, according to an embodiment. At block 402, a thread gains access to a protected memory. The protected memory is the protected memory referred to in FIG. 3 and includes the saved operations and the gate flag mechanism. The thread that gains access to the protected area is not necessarily the same thread that had previously written the operations to the protected memory. Instead, in a recovery-aware environment, all threads in the environment should agree on the technique used for recovery. Thus, a thread that inherits the rights to the protected area should execute the recovery process appropriate for the environment.

At block 404, the thread analyzes the protected memory. If the protected memory contains operations, then at block 406, the thread analyzes the gate flag mechanism. If the gate flag mechanism indicates that the transaction was a success (e.g., all operations were saved to the protected memory), then at block 408, the thread processes the operations found in the protected memory. Processing the operations causes the operations to take effect and brings the shared memory up to date. After performing the recovery operations, the thread may then use the protected memory for its original intent. In the case where the thread that processed the recovery operations is the thread that wrote the operations, then the thread may be finished with use of the protected area and release it for use by other threads.

Figure 5:
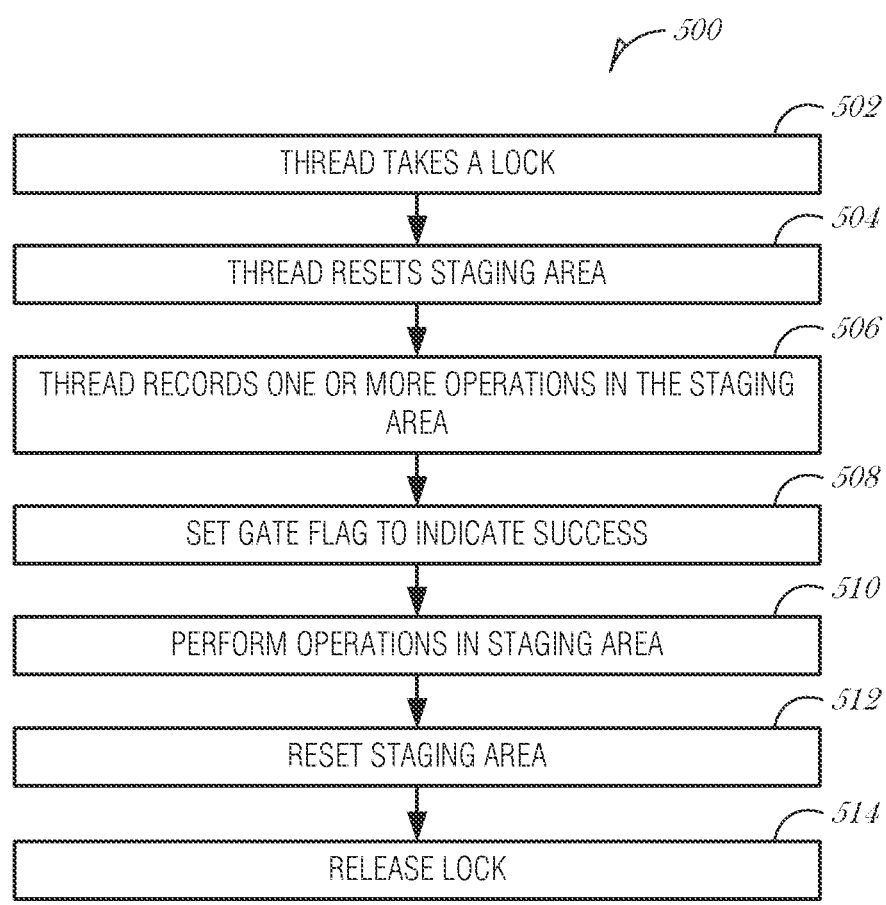
FIG. 5 is a flowchart illustrating a method to provide a lock-based implementation of a transaction-based shared memory protection, according to an embodiment.

FIG. 5 is a flowchart illustrating a method 500 to provide a lock-based implementation of a transaction-based shared memory protection, according to an embodiment. At block 502, a thread takes a lock. The lock is used to provide exclusive access to shared memory. The lock may be implemented and provided by an operating system mechanism. The lock may be assigned to the thread based on mechanisms including semaphores or mutexes. The assumption in block 502 is that the thread acquires a fresh lock. When the thread acquires a revived lock, one that is provided with an indication that the thread that previously held the lock was aborted, interrupted, restarted, or killed prematurely, then a recovery operation is used. The recovery operation is described further in FIG. 6 below.

At block 504, the thread resets a transaction staging area. For example, the thread may zero-out the memory of the staging area, or otherwise initialize it. The staging area may exist in a per-thread memory pool. The staging area may exist in shared memory.

At block 506, the thread records one or more operations in the staging area. The operations may resemble the form "update [address] with [value]". The operations are used to update memory shared between several threads. The operations may be considered a transaction.

At block 508, once the operations have been successfully recorded in the staging area, a gate flag is set to indicate success. The gate flag is specific to the staging area.

At block 510, the operations in the staging area are performed.

At block 512, after the operations in the staging area are performed, the staging area is reset. In an embodiment, the staging area may be reset by writing zeros to the memory locations in the staging area.

At block 514, the lock is released.

Figure 6:
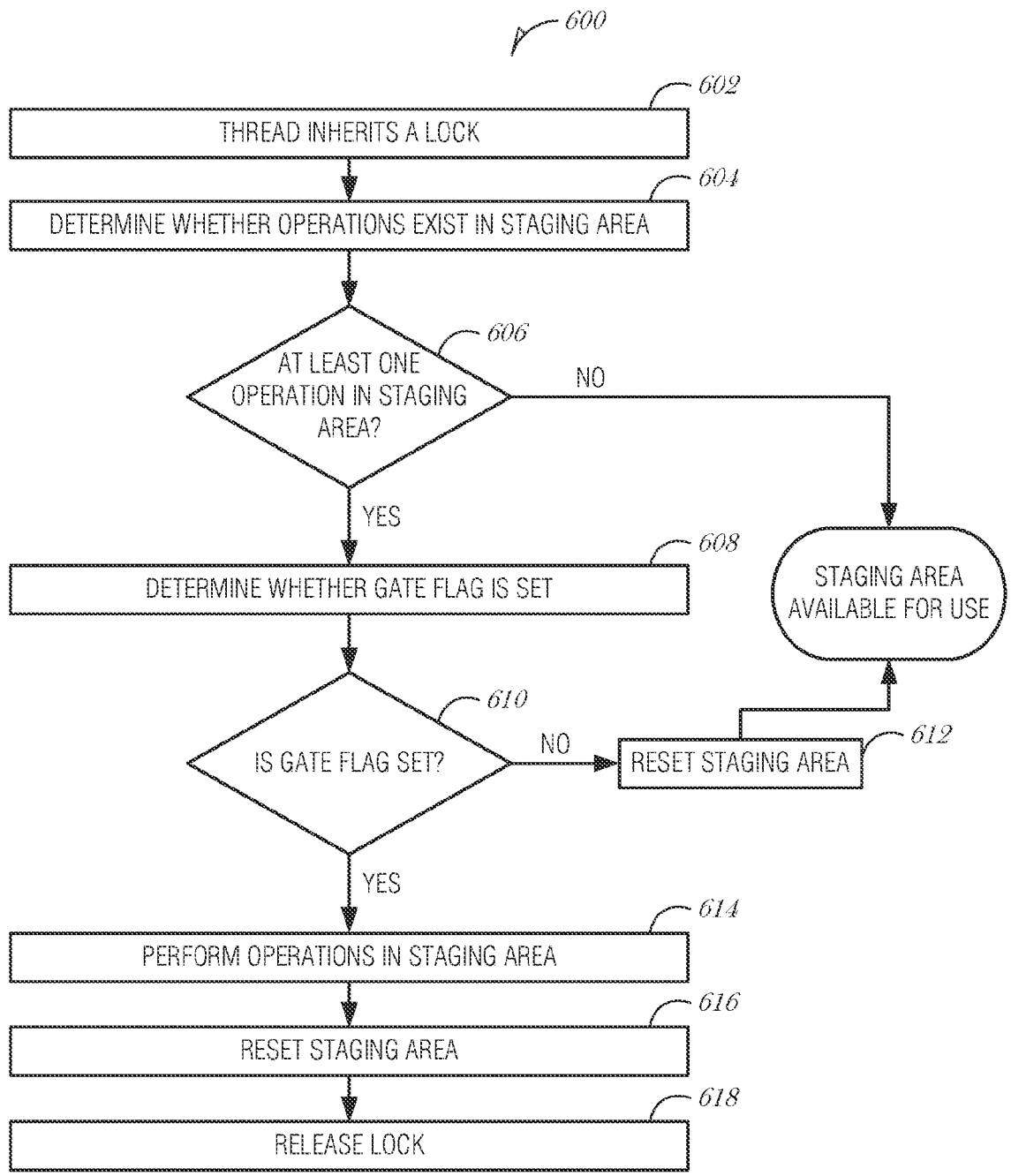
FIG. 6 is a flowchart illustrating a method to provide a lock-based implementation for recovery after a thread has been killed or restarted, according to an embodiment.

FIG. 6 is a flowchart illustrating a method 600 to provide a lock-based implementation for recovery after a thread has been killed or restarted, according to an embodiment. At block 602, a lock is inherited by a thread after a restart.

At block 604, the staging area is analyzed to determine whether there are operations contained within it.

At decision block 606, if there is at least one operation contained within the staging area, then the method continues to block 608. If there are no operations in the staging area, then the staging area is available for use by the thread.

At block 608, if there is at least one operation contained within the staging area, then it is determined whether the gate flag is set.

At decision block 610, if the gate flag is set, then the operations contained within the staging area represent a successful transaction and the method continues to block 614. If the gate flag is not set, then the operations in the staging area represent a failed attempt to write out a transaction. In this case, the staging area is available for use by the thread. It is understood that the staging area may first be reset to ensure that no stale entries exist before being used by the thread. Thus, at block 612, the staging area is reset before it used.

At block 614, if there is at least one operation in the staging area and the gate flag is set, then the operations are performed.

At block 616, after the operations are completed, the staging area is reset. It is understood that after the staging area has been reset at block 616, the thread is free to make use of the staging area for its own purposes prior to releasing the lock.

At block 618, the lock is released.

Figure 7:
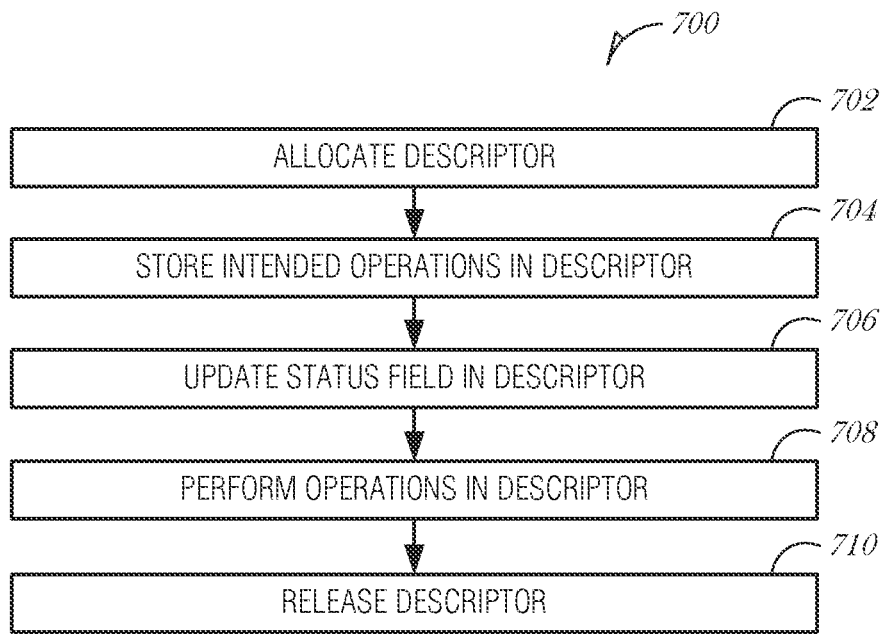
FIG. 7 is a flowchart illustrating a method to provide a lock-free/wait-free implementation of transaction-based shared memory protection, according to an embodiment.

FIG. 7 is a flowchart illustrating a method 700 to provide a lock-free/wait-free implementation of transaction-based shared memory protection, according to an embodiment. A lock-free/wait-free implementation is based on a multi-word compare-and-swap operation. As is understood in the art, a single-word compare-and-swap (CAS) operation is a primitive atomic processor instruction used in multithreading to achieve synchronization. A CAS operation compares the contents of a memory location to a given value and if and only if they are the same, the CAS operation modifies the contents of the memory location with a new value. The atomicity guarantees that the write operation occurs on the memory location before any other thread has access to read or write to the location. An extension of the single-word CAS operation is a multi-word CAS operation. Where a single-word CAS operation may be referred to as CAS-1 or CAS1, indicating that one word is operated on, a multi-word CAS operation may be referred to as a CAS-N or CASN operation.

One implementation of a CASN mechanism builds up a structure based on available CAS1 primitives. At the center of the CASN mechanism is a descriptor. A descriptor is a data structure that holds information used in the CASN operation, including a control address, addresses to be updated, values expected at each address, new values to store at each address, and a status field indicating the status of the CASN operation. A thread activates a descriptor by storing a pointer to the descriptor at the control address. When other threads see the pointer in shared memory, they understand that a descriptor is being used to update other portions of shared memory. After storing the descriptor's pointer at the control address, the CASN operation proceeds by storing a pointer to the descriptor in each memory location that is to be updated by the descriptor, checking that each location holds the expected value before storing the pointer. When another thread sees the pointer to the descriptor, that thread knows that the memory location is being updated. If a location does not hold the expected value, the descriptor is used to back out the transaction by setting each memory location already accessed back to the original value using the expected value in the descriptor. Once all of the memory locations are successfully updated to include pointers to the descriptor, then the descriptor status flag is set to indicate success and the descriptor is used to modify the contents of the memory locations with the new values.

A descriptor is used by a thread to store a group of operations in a similar manner as the staging area in the embodiment described with respect to FIG. 5. Although one implementation of a descriptor is disclosed herein, it is understood that other data structures and mechanisms may be used to implement a descriptor as a mechanism to implement multi-word atomic operation.

At block 702, a descriptor is allocated. Thereafter, as shown at block 704, the intended operations are stored in the descriptor. A status field is updated to indicate that the descriptor is ready (block 706). At block 708, the operations are performed. In an embodiment, the operations are performed by reading each memory location, determining whether the location holds a pointer to the descriptor, accessing the descriptor, and updating the memory location with the new value associated with the memory address stored in the descriptor. The descriptor is released after the operations are performed (block 710).

After the descriptor is marked as being ready, the transaction of operations contained in the descriptor is considered a successful transaction. Threads that access memory locations referenced in the descriptor will recognize a reference to the descriptor (e.g., pointer) and then process the descriptor accordingly to either obtain the value directly from the descriptor or assist in processing the descriptor's operation. In a collaborative environment, when one thread accesses a memory location with a pointer to a descriptor of another thread, the thread may access the descriptor and process the operation for the memory location. Processing may be dependent on whether a successful status is indicated in the descriptor's status field.

In a non-collaborative environment, when one thread accesses a memory location with a pointer to a descriptor, the thread may access the descriptor and obtain the old value or the new value associated with the address based on the status field. If the status field indicates that the descriptor is ready (e.g., a successful transaction), then the thread may obtain the new value. Otherwise, the thread may obtain the old value.

Figure 8:
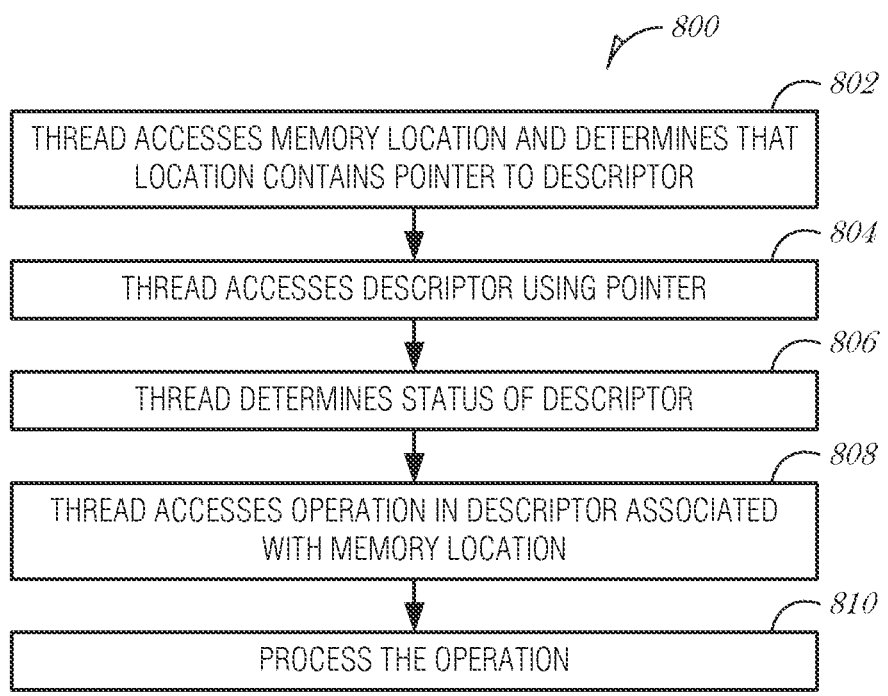
FIG. 8 is a flowchart illustrating a method to provide a lock-free/wait-free implementation for recovery after a thread has been killed or restarted, according to an embodiment.

FIG. 8 is a flowchart illustrating a method 800 to provide a lock-free/wait-free implementation for recovery after a thread has been killed or restarted, according to an embodiment. FIG. 8 illustrates a thread restart process in a collaborative environment. If collaboration is used in an environment, then each thread should be configured to use collaboration. At block 802, a thread accesses a memory location and determines that the location holds a pointer to a descriptor. In an embodiment, a thread that has been restarted accesses a descriptor that was being previously operated on. The thread then accesses each memory location in the descriptor. At each memory location, the thread performs the operation of block 802.

At block 804, the thread accesses the descriptor using the pointer to the descriptor.

At block 806, the thread determines the status of the descriptor. In an embodiment, the descriptor may have one of several states, including an undecided state or status, a failed state or status, and a succeeded state or status. A descriptor is initially set to UNDECIDED. If all of the memory updates to install a pointer to the descriptor are successful, then the transaction is considered complete and the descriptor is marked as SUCCEEDED. If one of the memory updates fails, then the descriptor is marked as FAILED and the memory updates to that point are rolled back.

At block 808, the thread accesses the operation n the descriptor associated with the memory location.

At block 810, the thread processes the operation. In an embodiment, the thread uses a CAS operation to update the old value with the new value based on the entry in the descriptor for the memory location.

If the thread accesses a memory location and determines that the location does not have a pointer to a descriptor, then the thread may continue with processing the memory location according to whatever process it was going to perform. This provides an all-or-nothing behavior ensuring coherence across thread restarts.

Figure 9:
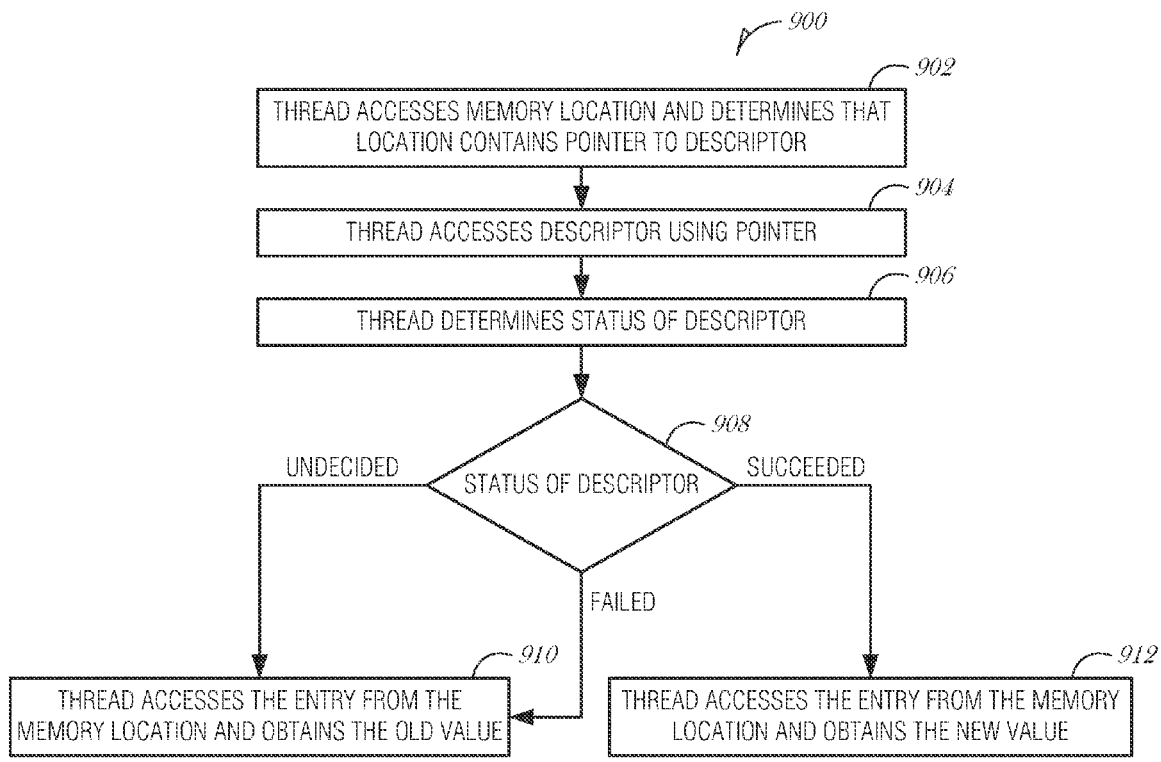
FIG. 9 is a flowchart illustrating a method to provide a lock-free/wait-free implementation for recovery after a thread has been killed or restarted, according to an embodiment.

FIG. 9 is a flowchart illustrating a method 900 to provide a lock-free/wait-free implementation for recovery after a thread has been killed or restarted, according to an embodiment. FIG. 9 illustrates a thread restart process in non-collaborative environment. At block 902, a thread accesses a memory location and determines that the location holds a pointer to a descriptor. At block 904, the thread accesses the descriptor using the pointer to the descriptor. At block 906, the thread determines the status of the descriptor. At decision block 908, the thread determines whether the status of the descriptor is UNDECIDED, FAILED, or SUCCEEDED. Based on the status, the method 900 continues at block 910 or 912.

At block 910, if the descriptor status is UNDECIDED or FAILED, then the thread accesses the entry for the memory location and obtains the old value. At block 912, if the descriptor status is SUCCEEDED, then the thread accesses the entry for the memory location and obtains the new value.

Figure 10:
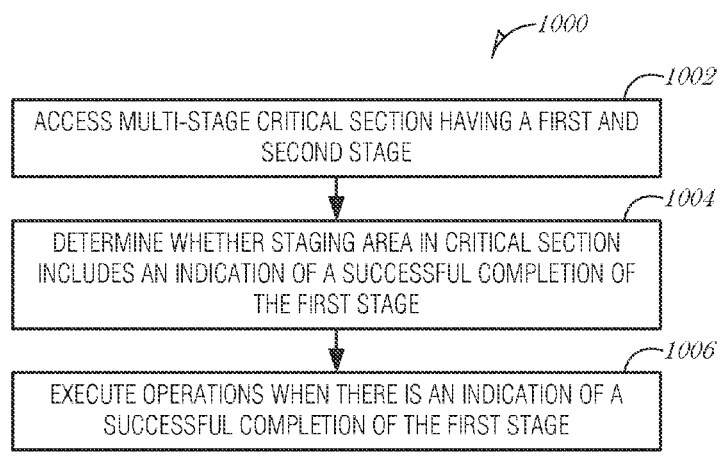
FIG. 10 is a flowchart illustrating a method 800 to provide recovery after a Thread has been killed or restarted, according to an embodiment.

FIG. 10 is a flowchart illustrating a method 1000 to provide recovery after a thread has been killed or restarted, according to an embodiment. At block 1002, a multi-stage critical section is accessed by a processing thread. In an embodiment, the multi-stage critical section includes a first and second stage, the first stage to store a staging area of a plurality of operations to be executed in the memory shared with at least one other processing thread, and the second stage to execute the operations from the staging area.

In an embodiment, the multi-stage critical section may be implemented with a descriptor, as discussed above with reference to FIGS. 7-8. Thus, accessing the multi-stage critical section includes reading a reference to the staging area from a memory location and then dereferencing the reference to access the staging area.

In a further embodiment, executing the operations includes identifying an operation stored in the staging area corresponding to the memory location and then executing the operation identified.

In a further embodiment, a second processing thread may access the multi-stage critical section, with the access performed by reading a reference to the staging area from a memory location, and dereferencing the reference to access the staging area. The status of the staging area is determined and then an old value or a new value is conditionally obtained from the staging area based on the status, the old and new value associated with the memory location in the staging area.

In an embodiment, the multi-stage critical section may be implemented with a lock-based mechanism, as discussed above with reference to FIGS. 5-6. Thus, according to an embodiment, the multi-stage critical section is implemented by acquiring a lock on the staging area to store the operations for the multi-stage critical section, storing the operations in the e staging area, and storing an indication of success once the operations have been stored to the staging area.

In an alternative embodiment, the multi-stage critical section may be implemented with a lock-free/wait-free mechanism, such as a descriptor, as discussed above with reference to FIGS. 7-8. Thus, according to an embodiment, the multi-stage critical section is implemented by storing the operations in a descriptor acting as the staging area by: storing a reference to the descriptor at each memory location to be updated and storing an indication of success once the memory locations of the operations have been updated with the reference to the descriptor. In such an embodiment, each operation includes a memory location to be updated and a value to store at the memory location to be updated.

At block 1004, it is determined whether the staging area includes an indication of successfully completing the first stage.

At block 1006, when there is an indication of successfully completing the first stage, the operations are executed. In an embodiment, executing e operations includes executing all instructions in the staging area. In another embodiment, operations are tracked such that when a thread restarts, only those operations that were not previously executed are executed in the recovery process.

While embodiments are described herein using multiple threads, it is understood that the techniques and devices used for recovery are also valid in a single-thread environment. Coherency issues may arise from the single thread leaving the memory in an inconsistent state, such that upon restart, the thread cannot recover cleanly. Thus, use of a staging area in persistent memory in the manner described in this document allows for efficient and reliable thread recovery.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 11:
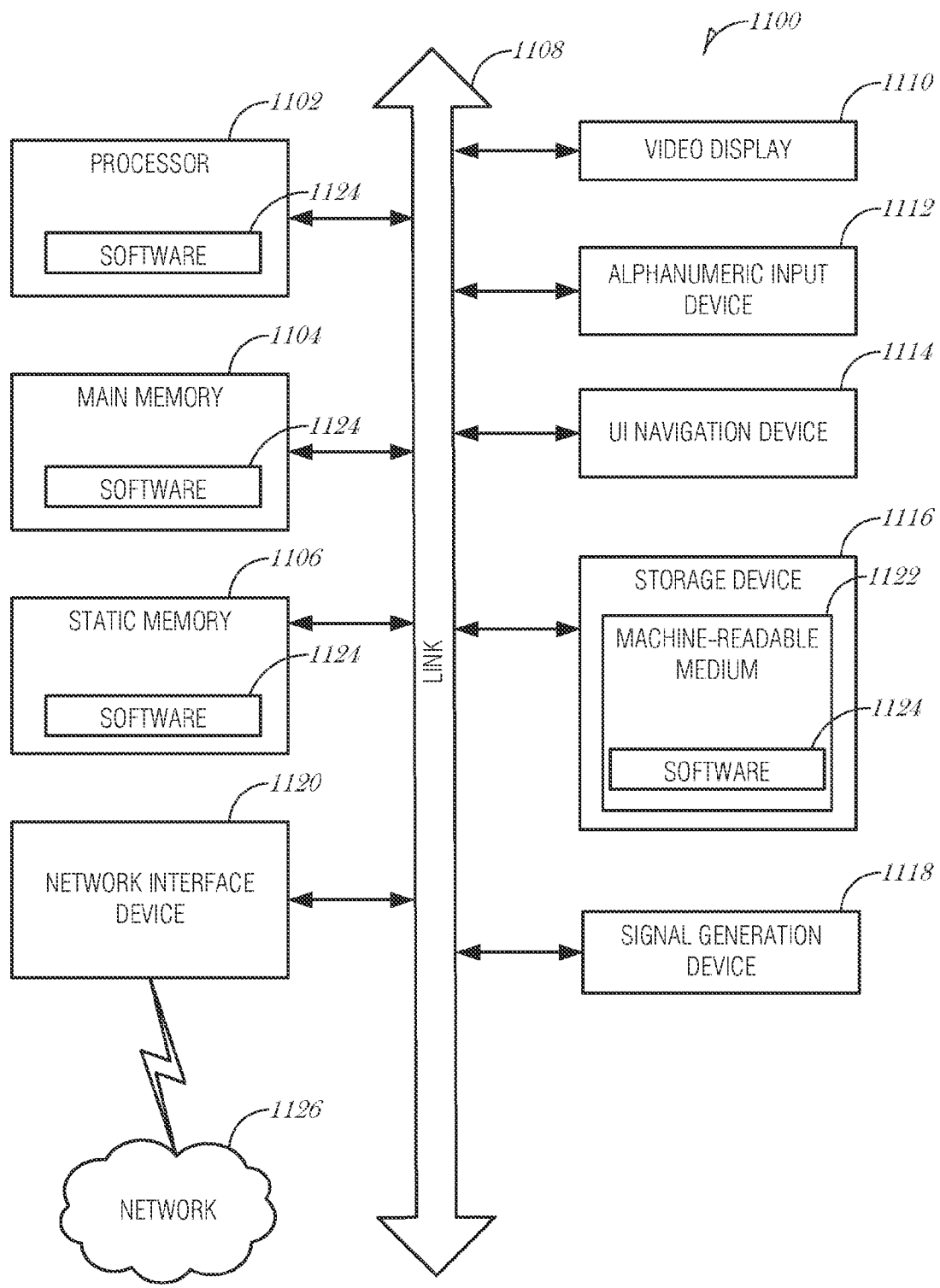
FIG. 11 is a block diagram illustrating a machine in the example form of a computer system, within which a set or sequence of instructions may be executed to cause the machine to perform any one of the methodologies discussed herein, according to an example embodiment.

FIG. 11 is a block diagram illustrating a machine in the example form of a computer system 1100, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices electrically programmable read-only memory (EPROM), electrically erasable programmable read-only memory (EEPROM) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although embodiments have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A machine-readable medium comprising instructions for thread recovery in a multi-threaded environment with at least one thread operating on memory shared with at least one other thread, the instructions when executed on a computing device, cause the computing device to:

execute a thread, wherein the thread is configured to:
  access a multi-stage critical section, the multi-stage critical section having a first and second stage, the first stage to store in a staging area a plurality of operations to be executed in the memory shared with at least one other thread, and the second stage to execute the operations from the staging area;
  determine whether the staging area includes an indication of successfully completing the first stage;
  execute the operations when there is an indication of successfully completing the first stage; and
  reset the staging area when there is no indication of successfully completing the first stage to ensure no stale entries exist before it is used;
  wherein the instructions to access the multi-stage critical section comprise instructions to:
    read a reference to the staging area from a memory location; and
    dereference the reference to access the staging area.

2. The machine-readable medium of claim 1, wherein the instructions to execute the operations comprise instructions to:
  identify an operation stored in the staging area corresponding to the memory location; and
  execute the operation identified.

3. The machine-readable medium of claim 1, comprising instructions to execute a second thread, wherein the second thread is configured to:
  access the multi-stage critical section by reading a reference to the staging area from a memory location, and dereferencing the reference to access the staging area;
  determine a status of the staging area; and
  conditionally obtain an old value or a new value from the staging area based on the status, the old and new value associated with the memory location in the staging area.

4. The machine-readable medium of claim 1, wherein the multi-stage critical section is implemented with instructions to:
  acquire a lock on the staging area to store the operations for the multi-stage critical section;
  store the operations in the staging area; and store an indication of success once the operations have been stored to the staging area.

5. A machine-readable medium comprising instructions for thread recovery in a multi-threaded environment with at least one thread operating on memory shared with at least one other thread, the instructions when executed on a computing device, cause the computing device to:
  execute a thread, wherein the thread is configured to:
    access a multi-stage critical section, the multi-stage critical section having a first and second stage, the first stage to store in a staging area a plurality of operations to be executed in the memory shared with at least one other thread, and the second stage to execute the operations from the staging area;
    determine whether the staging area includes an indication of successfully completing the first stage;
    execute the operations when there is an indication of successfully completing the first stage; and
    reset the staging area when there is no indication of successfully completing the first stage to ensure no stale entries exist before it is used;
  wherein each operation includes a memory location to be updated and a value to store at the memory location to be updated, and wherein to implement the multi-stage critical section, the machine-readable medium includes instructions to:
    store the operations in a descriptor acting as the staging area by:
      storing a reference to the descriptor at each memory location to be updated; and
      storing an indication of success once the memory locations of the operations have been updated with the reference to the descriptor.

6. The machine-readable medium of claim 5, wherein the instructions to execute the operations comprise instructions to execute all instructions in the staging area.

7. A method for thread recovery in a multi-threaded environment with at least one thread operating on memory shared with at least one other thread, the method comprising:
  accessing a multi-stage critical section using a thread, the multi-stage critical section having a first and second stage, the first stage to store in a staging area a plurality of operations to be executed in the memory shared with at least one other thread, and the second stage to execute the operations from the staging area;
  determining whether the staging area includes an indication of successfully completing the first stage;
  executing the operations when there is an indication of successfully completing the first stage; and
  resetting the staging area when there is no indication of successfully completing the first stage to ensure no stale entries exist before it is used;
  wherein accessing the multi-stage critical section comprises:
    reading a reference to the staging area from a memory location;
    dereferencing the reference to access the staging area.

8. The method of claim 7, wherein executing the operations comprise:
  identifying an operation stored in the staging area corresponding to the memory location; and
  executing the operation identified.

9. The method of claim 7, comprising:
  accessing the multi-stage critical section by a second thread, the accessing performed by reading a reference to the staging area from a memory location, and dereferencing the reference to access the staging area;
  determining a status of the staging area; and
  conditionally obtaining an old value or a new value from the staging area based on the status, the old and new value associated with the memory location in the staging area.

10. The method of claim 7, wherein the multi-stage critical section is implemented by:
  acquiring a lock on the staging area to store the operations for the multi-stage critical section;
  storing the operations in the staging area; and
  storing an indication of success once the operations have been stored to the staging area.

11. A method for thread recovery in a multi-threaded environment with at least one thread operating on memory shared with at least one other thread, the method comprising:
  accessing a multi-stage critical section using a thread, the multi-stage critical section having a first and second stage, the first stage to store in a staging area a plurality of operations to be executed in the memory shared with at least one other thread, and the second stare to execute the operations from the staging area;
  determining whether the staging area includes an indication of successfully completing the first stage;
  executing the operations when there is an indication of successfully completing the first stage; and resetting the staging area when there is no indication of successfully completing the first stage to insure no stale entries exist before it is used;

wherein each operation includes a memory location to be updated and a value to store at the memory location to be updated, and wherein to implement the multi-stage critical section, the method comprises:

storing the operations in a descriptor acting as the staging area by:

storing a reference to the descriptor at each memory location to be updated; and storing an indication of success once the memory locations of the operations have been updated with the reference to the descriptor.

12. The method of claim 11, wherein executing the operations comprise executing all instructions in the staging area.

13. A computing system configured for thread recovery in a multi-threaded environment with at least one thread operating on memory shared with at least one other thread, the computing system comprising:

a computing processor; and a memory to hold instructions, which when executed by the computing processor, cause the computing processor to:

execute a thread, wherein the thread is configured to:

access a multi-stage critical section, the multi-stage critical section having a first and second stage, the first stage to store in a staging area a plurality of operations to be executed in the memory shared with at least one other thread, and the second stage to execute the operations from the staging area;

determine whether the staging area includes an indication of successfully completing the first stage;

execute the operations when there is an indication of successfully completing the first stage; and reset the staging area when there is no indication of successfully completing the first stage to ensure no stale entries exist before it is used;

wherein the instructions to access the multi-stage critical section comprise instructions to:

read a reference to the staging area from a memory location;

dereference the reference to access the staging area.

14. The computing system of claim 13, wherein the instructions to execute the operations comprise instructions to:

identify an operation stored in the staging area corresponding to the memory location; and execute the operation identified.

15. The computing system of claim 13, comprising instructions to execute a second thread, wherein the second thread is configured to:

access the multi-stage critical section by reading a reference to the staging area from a memory location, and dereference the reference to access the staging area;

determine a status of the staging area; and conditionally obtain an old value or a new value from the staging area based on the status, the old and new value associated with the memory location in the staging area.

16. The computing system of claim 13, wherein the multi-stage critical section is implemented with instructions to:

acquire a lock on the staging area to store the operations for the multi-stage critical section;

store the operations in the staging area; and store an indication of success once the operations have been stored to the staging area.

17. A computing system configured for thread recovery in a multi-threaded environment with at least one thread operating on memory shared with at least one other thread, the computing system comprising:

a computing processor; and a memory to hold instructions, which when executed by the computing processor, cause the computing processor to:

execute a thread, wherein the thread is configured to:

access a multi-stage critical section, the multi-stage critical section having a first and second stage, the first stage to store in a staging area a plurality of operations to be executed in the memory shared with at least one other thread, and the second stage to execute the operations from the staging area;

determine whether the staging area includes an indication of successfully completing the first stage;

execute the operations when there is an indication of successfully completing the first stage; and reset the staging area when there is no indication of successfully completing the first stage to ensure no stale entries exist before it is used;

wherein each operation includes a memory location to be updated and a value to store at the memory location to be updated, and wherein to implement the multi-stage critical section, the machine-readable medium includes instructions to:

store the operations in a descriptor acting as the staging area by:

storing a reference to the descriptor at each memory location to be updated; and storing an indication of success once the memory locations of the operations have been updated with the reference to the descriptor.

18. The computing system of claim 17, wherein the instructions to execute the operations comprise instructions to execute all instructions in the staging area.

* * * * *